United States Patent [19]

Maly et al.

[11] 4,090,562
[45] May 23, 1978

[54] METHOD AND SOLVENT COMPOSITION FOR STIMULATING THE PRODUCTION OF OIL FROM A PRODUCING WELL

[75] Inventors: George P. Maly, Newport Beach; John A. Landess, Costa Mesa; Thomas Foral, Brea, all of Calif.

[73] Assignee: Union Oil Company of California, Brea, Calif.

[21] Appl. No.: 709,624

[22] Filed: Jul. 29, 1976

Related U.S. Application Data

[62] Division of Ser. No. 422,657, Dec. 7, 1973, Pat. No. 3,998,743.

[51] Int. Cl.$^2$ .................. E21B 43/25; E21B 43/12
[52] U.S. Cl. ............................. 166/304; 166/305 R; 252/8.55 B
[58] Field of Search .............. 252/8.3, 8.55 B, 8.55 D; 166/304, 305 R, 312

[56] References Cited

U.S. PATENT DOCUMENTS

| 2,356,205 | 8/1944 | Blair et al. ........................ 252/8.55 |
| 2,753,939 | 7/1956 | Carpenter et al. .............. 252/8.55 X |
| 3,241,614 | 3/1966 | Bertness ............................. 166/304 |
| 3,279,541 | 10/1966 | Knox et al. ....................... 252/8.55 |
| 3,402,770 | 9/1968 | Messenger ..................... 166/312 X |
| 3,756,319 | 9/1973 | Holm et al. ......................... 166/304 |

Primary Examiner—Herbert B. Guynn
Attorney, Agent, or Firm—Richard C. Hartman; Dean Sandford; Gerald L. Floyd

[57] ABSTRACT

A method and solvent composition for removing viscous crude oil, waxes, asphaltenes and resin precipitates of petroleum origin from oil wells, flow lines and pore spaces of oil-bearing formations. The solvent composition is a mixture of about 45 to about 85 volume percent of a nornally liquid aliphatic hydrocarbon boiling in the range of about 120° F. to about 550° F., between about 5 to 45 volume percent of a normally liquid aromatic hydrocarbon, between about 0.5 to about 6 volume percent of an ether of an aliphatic polyhydric alcohol, and between about 1 to about 15 volume percent of a lower alkyl monohydric alcohol.

4 Claims, No Drawings

METHOD AND SOLVENT COMPOSITION FOR STIMULATING THE PRODUCTION OF OIL FROM A PRODUCING WELL

This is a division, of application Ser. No. 422,657, filed Dec. 7, 1973, now U.S. Pat. No. 3,998,743.

BACKGROUND OF THE INVENTION

1. Field of the Invention

This invention relates to the treatment of oil wells and more particularly to the removal of viscous crude oil, waxes, asphaltenes and resins of petroleum origin from wells, flow lines and the pore spaces in oil-bearing formations.

2. Description of the Prior Art

In the production of petroleum oil and/or gas from a subterranean formation through a well bore leading to the surface of the earth, difficulty is often encountered due to the accumulation of heavy hydrocarbon deposits in flow passages within the well, but more particularly within the pore spaces of the oil-bearing formation itself. The accumulation of heavy hydrocarbons such as waxes, asphaltenes and resin precipitates of petroleum origin ultimately can result in plugging. These accumulations of heavy hydrocarbons are solid or semi-solid at the conditions existing within the well and oil-bearing formation and can reduce the size of the passageways through which the oil or gas must flow. Eventually, with continued production, the well flow passages and the pores of the oil-bearing formation become plugged or restricted. In aggravated cases, accumulation of these heavy hydrocarbons can occur to the extent that the fluid flow to the well, or within the well flow passages, is completely restricted.

A variety of procedures to remove these accumulations of heavy hydrocarbons involving contacting the accumulations with solvents for heavy hydrocarbons are known in the art. Generally, expensive aromatic solvents like toluene, benzene, xylene and hydrocarbon distillates having high aromatic contents, or mixtures of these aromatic compounds with diesel or crude oil are employed. These conventional solvent compositions are usually applied with pressure and in some cases require preheating prior to injection into the well. One drawback in prior art solvent treatments is the rapid swelling of the heavy hydrocarbon deposits in the pores of the formation when contacted with conventional solvent compositions. It is a well known phenomenon that solids when contacted with solvent must swell before they can dissolve. The resulting swelled deposits aggravate the plugging condition by more completely filling the pore spaces. Any further solvent injection is useless unless sufficient pressure is available to overcome this plugging. Even then, the tendency of the injected solvent composition is to finger through the largest channel network in the formation which offers the least resistance and to displace these accumulations of viscous crude oil, waxes, asphaltenes and resin precipitates further away from the well, where they may be in time dissolved and/or dispersed. However, such finger channels may represent only a small fraction of the total channel network of the formation. In most cases, this gives satisfactory results for a short duration but upon return of the well to production these finger channels become rapidly plugged again.

In addition to the above described plugging problem, all oil-bearing sand formations contain interstitial water in the form of a continuous channel network. This thin film of water, which is generally immiscible with conventional solvents, further retards the action of the solvents in dissolving the heavy hydrocarbons. There exists a need in the oil recovery art for economical and effective solvent compositions useful for removing heavy hydrocarbon accumulations which avoid the disadvantages and drawbacks associated with the prior known methods and solvent compositions for treating oil wells.

SUMMARY OF THE INVENTION

We have now found an economical and effective method for removing viscous crude oil, waxes, asphaltenes and resin precipitates of petroleum origin from pore spaces of oil-bearing formations through the use of novel solvent compositions. These novel compositions are miscible with the interstitial water and penetrate the pore formation by using the interstitial water network as flow channels, thus effectively dissolving the heavy hydrocarbon precipitates and cleansing the pores without substantial fingering. These solvent compositions comprise about 45 to 85 volume percent of a normally liquid aliphatic hydrocarbon boiling within the range of about 120° F to about 550° F., about 5 to 45 volume percent of a normally liquid aromatic hydrocarbon, about 0.5 to 6 volume percent of an ether of an aliphatic polyhydric alcohol, and about 1 to 15 volume percent of a lower alkyl monohydric alcohol.

DESCRIPTION OF THE PREFERRED EMBODIMENTS

In accordance with the invention, a subterranean oil-bearing formation is treated by a procedure involving the steps of contacting the oil-bearing formation with the solvent composition of this invention. According to the present invention, oil and gas wells can be treated without resorting to the necessity of preheating the solvent prior to injection into the well. Moreover, because of the particular effectiveness of the present composition and its dissolving activity, a substantial reduction in the required quantity of solvent is realized, while still providing an excellent increase in productivity along with effective removal and elimination of all objectionable deposits. The same general mode of operation can be employed in cleaning out tanks, pumps, refinery equipment and like in which the heavy hydrocarbon accumulations are present.

In treating wells to increase the production thereof, various techniques may be employed ranging from simple application of cold solvent to the tubing, pump and other pieces of oil equipment to more complicated procedures directed to treating the oil producing formation with the solvent at points considerably removed from the well. It is generally preferred that the injection pressure be maintained below that necessary to fracture the formation so that reasonably uniform penetration of the solvent composition into the formation matrix occurs. After a time the rate can generally be increased as the matrix permeability increases due to the solvent action. In some cases, where deeper penetration is required, standard displacing fluids may be used to displace the solvent into the formation. Fluids generally used for this purpose include nitrogen, natural gas, filtered crude oil, kerosene, water, polymer solutions and the like.

The normally liquid aliphatic hydrocarbon component of the present solvent system may be any normally liquid aliphatic hydrocarbon boiling in the range of about 120° to about 550° F. For example, kerosene or other aliphatic hydrocarbon distillates derived from petroleum may be used, but most preferable are aviation turbine fuels, and most preferred is Jet A, an aviation turbine fuel meeting ASTM standard specification D-1655 entitled "Standard Specification for Aviation Turbine Fuels", ASTM Standards, American Society for Testing Materials, Part 17, November 1971, pages 554–556, which specification is herein incorporated by reference.

The aromatic hydrocarbon component of the present solvent system may be any normally liquid aromatic hydrocarbon which has a boiling point above about 175° F., e.g., benzene, toluene, xylene, ethylbenzene, cumene, mesitylene, propylbenzene, etc. Toluene is usually preferred.

The ether component may be any normally liquid aliphatic ether of an aliphatic polyhydric alcohol which contains at least one free hydroxyl group and has a boiling point above 212° F. Ether-alcohols of this type containing less than about 20 carbons are useful and those containing less than 12 carbons are preferred. Suitable ethers of this type include the mono-ethyl, -ethyl, -propyl, and -butyl ethers of ethylene glycol and diethylene glycol, and mono-methyl and di-methyl, -ethyl, -propyl, -butyl ethers of glycerol, the mono-methyl and -ethyl ethers of butanediol, etc. Most preferred is ethylene glycol monobutyl ether.

The lower alkyl monohydric alcohol component may contain from 1 to 6 carbon atoms. Preferred alcohols are, for example, methanol, ethanol, propanol, butanol, etc., most preferred, however, is ispropanol.

The proportions in which the foregoing components are mixed to prepare the new solvent systems are approximately as follows:

| | Percent by Volume |
|---|---|
| Aliphatic hydrocarbon | 45–85 |
| Aromatic hydrocarbon | 5–45 |
| Ether of an aliphatic polyhydric alcohol | 0.5–6 |
| Alkyl monohydric alcohol | 1–15 |

The solvent composition of this invention can be prepared by simply admixing the ingredients in the desired proportions.

A preferred solvent composition comprises from about 50 to about 80 volume percent of normally liquid aliphatic hydrocarbon, from about 10 to about 30 volume percent of normally liquid aromatic hydrocarbon, from about 1 to about 5 volume percent of an ether of an aliphatic polyhydric alcohol, and from about 1 to about 10 volume percent of an alkyl monohydric alcohol.

A particularly preferred solvent of the present invention contains 77 volume percent aviation turbine fuel Jet A, 20 volume percent toluene, 1 volume percent ethylene glycol monobutyl ether and 2 volume percent isopropanol.

The inventions are further described by the following examples which are illustrative of specific modes of practicing the invention and are not intended as limiting the scope of the invention defined by the appended claims.

EXAMPLE 1

A Dundee No. 2 sandstone core approximately 1-inch in diameter and 1-inch long is mounted in a brass tubing with a curable epoxy composition and cured for approximately 16 hours. The core is saturated under vacuum with field brine, then immersed in brine, heated to approximately 180° F. and restored with hot field crude oil. The field crude contains 7.3 weight percent asphaltenes and 3.7 weight percent 132° F. melting point paraffin wax. To this field crude is added 8 weight percent of a 135° F. melting point fully refined paraffin wax. The restored core is placed in a testing apparatus maintained at 180° F. This testing apparatus comprises a hollow stainless steel cylinder having a test core holding means; a test core mounted in a brass tubing with thermoset resin; a solvent holding chamber above and in direct communication with the test core; a top stainless steel closure with gas inlet means; and a bottom stainless steel closure with outlet means. The system is cooled to room temperature. Excess crude is removed from the solvent chamber leaving approximately ⅛ inch layer of gelled crude oil on the top of the core. Then the chamber is filled with 85 milliliters of toluene. Nitrogen gas is injected into the solvent chamber to maintain a pressure of 5 psi over the solvent. All of the toluene passes through the core in 494 seconds. Distinct flow channels in the gelled crude oil are noticed on the top face of the core. The bottom face of the core sample is black showing only 4 light spots of approximately less than 1 square millimeter each.

EXAMPLE 2

The above test is repeated except that the toluene is replaced by the solvent composition of this invention comprising an admixture of 77 volume percent of turbine fuel Jet A, 20 volume percent of toluene, 1 volume percent of ethylene glycol monobutyl ether and 2 volume percent of isopropanol. All of the solvent composition passes through the core in 313 seconds. Upon inspection the sand is fully exposed on the top face of the core and there is essentially no gelled crude oil remaining. On the bottom face the sand is clean and only slightly brown colored. These comparative tests clearly indicate the superiority of the present solvent composition in removing crude oil, waxes, asphaltenes and resin precipitates of petroleum origin from pore spaces of oil-bearing formations as compared with a conventional solvent.

EXAMPLE 3

A well was producing 17° API gravity crude at an average rate of 90 barrels per day. The production had declined rapidly. An attempt to stimulate production with both hot oil and acid dispersion treatment was unsuccessful, and the production dropped to 20 barrels per day when the well was completely pumped off. The problem was diagnosed as plugging from waxes, asphaltenes, and resin precipitates which had accumulated in the formation around the well bore and blocked flow from the formation. This well is taken out of production and 5000 gallons of a solvent composition containing 77 volume percent of aviation turbine fuel Jet A, 20 volume percent of toluene, 1 volume percent of ethylene glycol monobutyl ether and 2 volume percent of isopropanol is injected into the well. The well is shut in for about 6 hours, after which the well is placed in production at around 80 bbls/day. After about three months of production, the production is stabilized to about 45 barrels per day with fluid level 800 feet over pump. This increase is not observed in the adjacent wells which are not treated with the solvent.

As will be apparent to those skilled in the art, the principle of the invention may be applied in various ways in combination with various techniques to effect the removal of crude oil, wax, asphaltene and resin precipitates of petroleum origin, and the like, deposited from crude oil or petroleum distillates and residua in a wide variety of inaccessible places. In its broadest aspects, the invention consists of the herein defined solvent mixtures comprising normally liquid aliphatic hydrocarbons, normally liquid aromatic hydrocarbons, ethers of aliphatic polyhydric alcohols, and alkyl monohydric alcohols, and the method of removing waxes, asphaltenes and resin precipitates of petroleum origin with said solvent compositions to effect their solution and/or dispersion therein. Other modes of applying the principle of our invention may be employed instead of those explained, change being made as regards the materials or methods disclosed herein, provided the steps or compositions set forth in any of the following claims, or the equivalent of such steps or compositions, be employed or obtained.

Having now described the invention, we claim:

1. The method for removing viscous crude oil, waxes, asphaltenes and resin precipitates of petroleum origin from pore spaces of oil-bearing formations, wells and flow lines comprising contacting said waxes, asphaltenes and resin precipitates of petroleum origin with a solvent composition consisting essentially of between about 45 to 85 volume percent of a normally liquid aliphatic hydrocarbon boiling in the range of about 120° to about 550° F. selected from the group consisting of kerosene and aviation turbine fuels; about 5 to 45 volume percent of a normally liquid aromatic hydrocarbon having a boiling point above about 175° F. selected from the group consisting of benzene, toluene, ethylbenzene, cumene, mesitylene and propylbenzene; about 0.5 to 6 volume percent of an aliphatic ether of an aliphatic polyhydric alcohol containing at least one free hydroxyl group, having a boiling point above 212° F. and containing less than about 20 carbon atoms selected from the group consisting of ethylene glycol monobutyl ether and monomethyl ether diethylene glycol; and about 1 to 15 volume percent of a lower alkyl monohydric alcohol selected from the group consisting of methanol, ethanol, propanol, isopropanol and butanol.

2. The method defined in claim 1 wherein said solvent composition is an admixture of aviation turbine fuel, toluene, ethylene glycol monobutyl ether and isopropanol.

3. The method of treating an oil-bearing formation which comprises introducing into a well penetrating said formation a solvent consisting essentially of about 45 to 85 volume percent of a normally liquid aliphatic hydrocarbon boiling in the range of about 120° to about 550° F. selected from the group consisting of kerosene and aviation turbine fuels, about 5 to 45 volume percent of a normally liquid aromatic hydrocarbon having a boiling point above about 175° F. selected from the group consisting of benzene, toluene, ethylbenzene, cumene, mesitylene and propylbenzene, about 0.5 to 6 volume percent of an aliphatic ether of an aliphatic polyhydric alcohol containing at least one free hydroxyl group, having a boiling point above 212° F. and containing less than about 20 carbon atoms selected from the group consisting of ethylene glycol monobutyl ether and monomethyl ether diethylene glycol, and about 1 to 15 volume percent of a lower alkyl monohydric alcohol selected from the group consisting of methanol, ethanol, propanol, isopropanol and butanol; and thereafter applying fluid pressure to said solvent to force it into the interstices of said formation.

4. The method for removing waxes, asphaltenes and resin precipitates of petroleum origin from pore spaces of oil-bearing formations, wells and flow lines comprising placing in contact with said waxes, asphaltenes and resin precipitates of petroleum origin a solvent composition comprising about 50 to 80 volume percent of Jet A aviation turbine fuel, about 10 to 30 volume percent of toluene, about 1 to 5 volume percent of ethylene glycol monobutyl ether, and about 1 to 10 volume percent of isopropanol.

* * * * *